United States Patent [19]

Yabe et al.

[11] Patent Number: 4,961,144
[45] Date of Patent: Oct. 2, 1990

[54] SELF-CHECK METHOD OF FOUR-WHEEL STEERING DRIVE SYSTEM

[75] Inventors: Hideo Yabe; Hideo Hori, both of Saitama, Japan

[73] Assignee: Jidosha Kiki Co., Ltd., Tokyo, Japan

[21] Appl. No.: 350,291

[22] Filed: May 11, 1989

[30] Foreign Application Priority Data

May 18, 1988 [JP] Japan ................... 63-119221

[51] Int. Cl.$^5$ ............................................. B62D 5/00
[52] U.S. Cl. ........................... 364/424.05; 364/424.03; 180/79.1; 180/142
[58] Field of Search ...................... 364/424.05, 424.01, 364/424.03; 180/140–142, 79.1; 280/91

[56] References Cited

U.S. PATENT DOCUMENTS

| | | | |
|---|---|---|---|
| 4,621,327 | 11/1986 | Dolph et al. | 364/424.05 |
| 4,660,671 | 4/1987 | Behr et al. | 180/142 |
| 4,745,514 | 5/1988 | Takeshima et al. | 180/142 X |
| 4,869,334 | 9/1989 | Marumoto et al. | 180/79.1 |

FOREIGN PATENT DOCUMENTS 62-14535  1/1987  Japan.
62-225467 10/1987  Japan.

Primary Examiner—Thomas G. Black
Attorney, Agent, or Firm—Blakely, Sokoloff, Taylor & Zafman

[57] ABSTRACT

In a self-check method of a four-wheel steering drive system, a relay downstream current upon ON/OFF of a relay is checked to check a state of said relay. Forward and reverse rotation control signals of a duty ratio of 0% are supplied to a predetermined combination of switching elements constituting an H bridge circuit to check if a current obtained from the predetermined combination of switching elements is an overcurrent, thereby checking a state of the H bridge circuit. When the rear wheels are turned to a target rear wheel position with reference to a present rear-wheel position, whether or not a difference between the target rear-wheel position and an actual rear-wheel position is set to be a predetermined value or less within a predetermined period of time is checked, thereby checking a state of a steering motor and a rear-wheel steering mechanism.

6 Claims, 4 Drawing Sheets

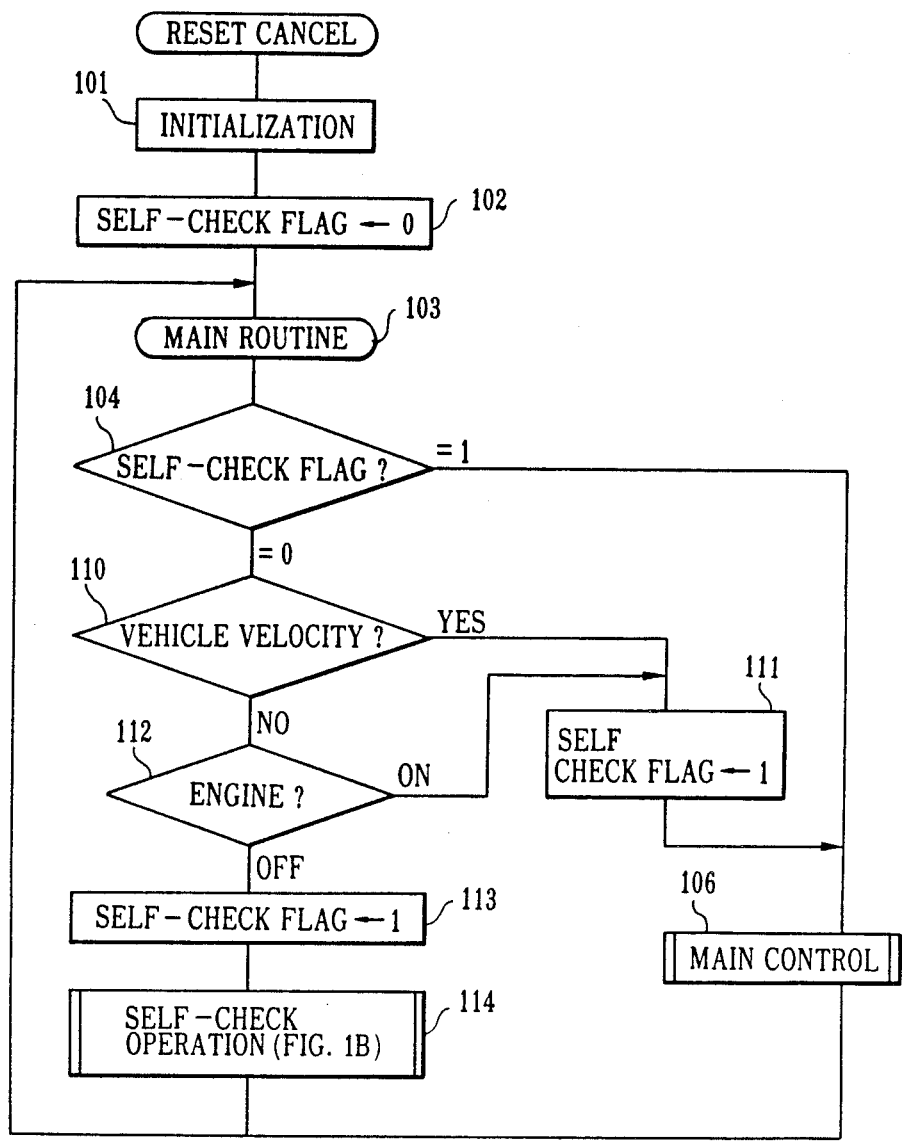
F I G. 1(A)

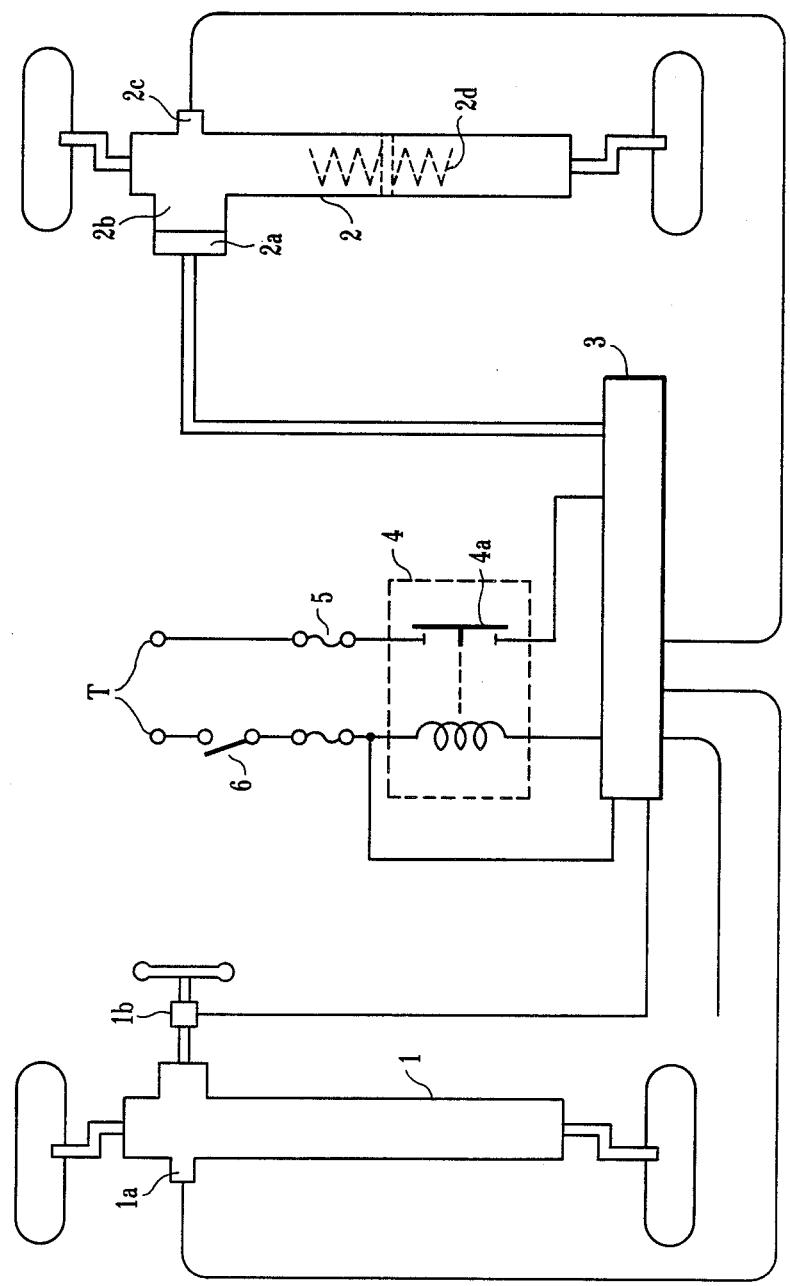

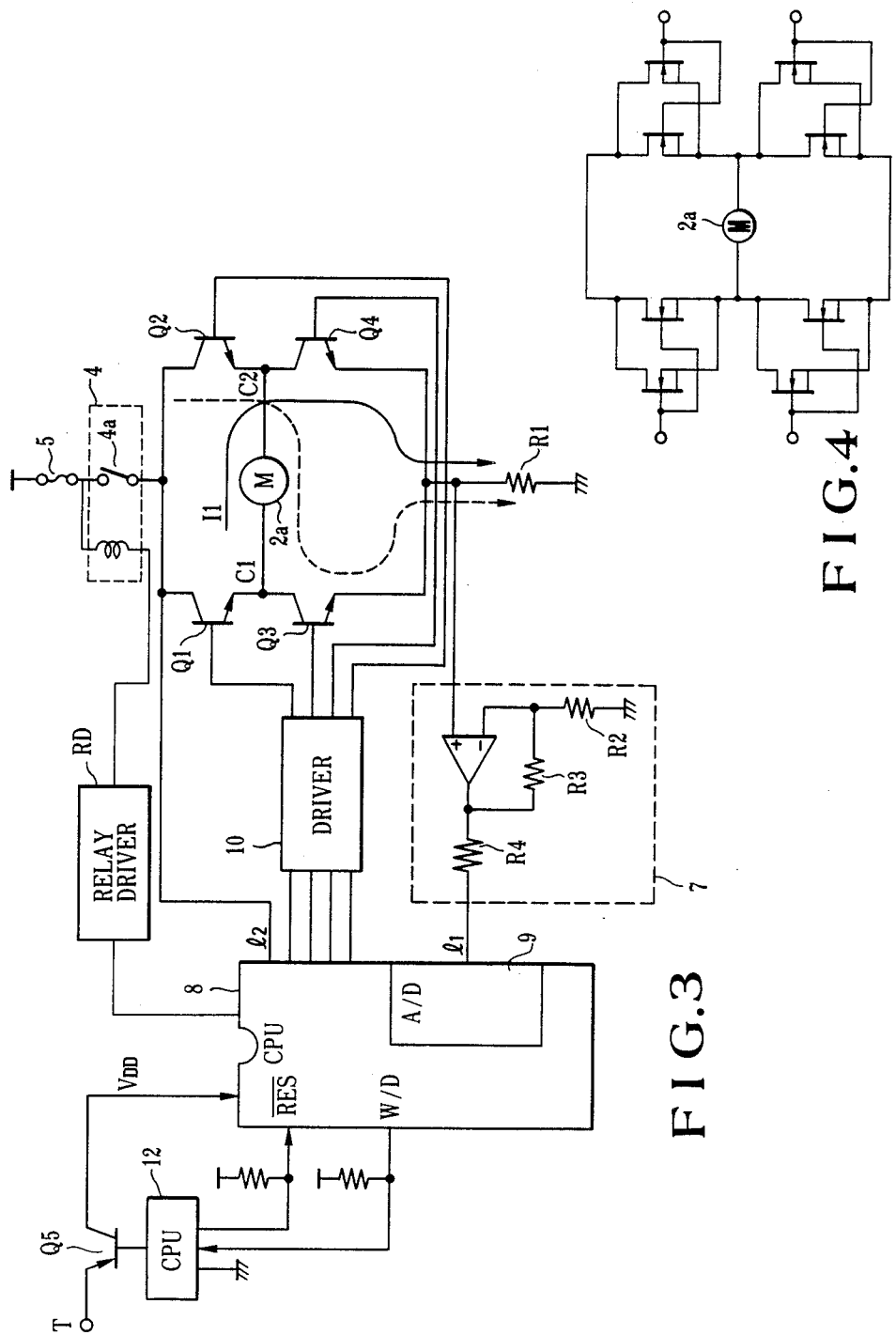
F I G. 4
F I G. 3

SELF-CHECK METHOD OF FOUR-WHEEL STEERING DRIVE SYSTEM

Background of the Invention

The present invention relates to a self-check method before starting traveling of an electrical four-wheel steering drive system.

In a conventional four-wheel steering drive system, only a steering sensor signal is used to check a malfunction of the system before starting traveling of a vehicle.

However, in an electrical four-wheel steering drive system, if the system malfunctions, rear wheels may be steered regardless of a steering operation. Such a malfunction cannot be detected by checking only the steering sensor signal.

Summary of the Invention

It is therefore an object of the present invention to provide a method of self-checking an electrical four-wheel steering drive system before starting traveling of a vehicle.

In order to achieve the above object, there is provided a self-check method of a four-wheel steering drive system for a vehicle, which comprises a rear-wheel steering mechanism steering rear wheels, a steering motor for driving the rear-wheel steering mechanism, an H bridge circuit, consisting of four switching elements, for driving the steering motor in a forward or reverse direction to turn the rear wheels to the left or right, and a relay for turning on/off a battery power supply with respect to the H bridge circuit, comprising the steps of, when an engine of the vehicle is in an idling state before starting traveling: (1) checking a relay downstream current upon ON/OFF of the relay to check a state of the relay; (2) supplying forward and reverse rotation control signals of a duty ratio of 0% to a predetermined combination of the switching elements constituting the H bridge circuit to check if a current obtained from the predetermined combination of switching elements is an overcurrent, thereby checking a state of the H bridge circuit; and (3) when the rear wheels are turned to a target rear wheel position with reference to a present rear-wheel position, checking whether or not a difference between the target rear-wheel position and an actual rear-wheel position is set to be not more than a predetermined value within a predetermined period of time, thereby checking a state of the steering motor and the rear-wheel steering mechanism.

Brief Description of the Drawings

FIG. 1A and 1B are flow charts for explaining an embodiment of a self-check method of a four-wheel steering drive system according to the present invention;

FIG. 2 is a diagram showing a general four-wheel steering apparatus;

FIG. 3 is a circuit diagram showing a current value detection system; and

FIG. 4 is a circuit diagram showing a modification of the H bridge circuit.

Description of the Preferred Embodiment

Figure 1B:
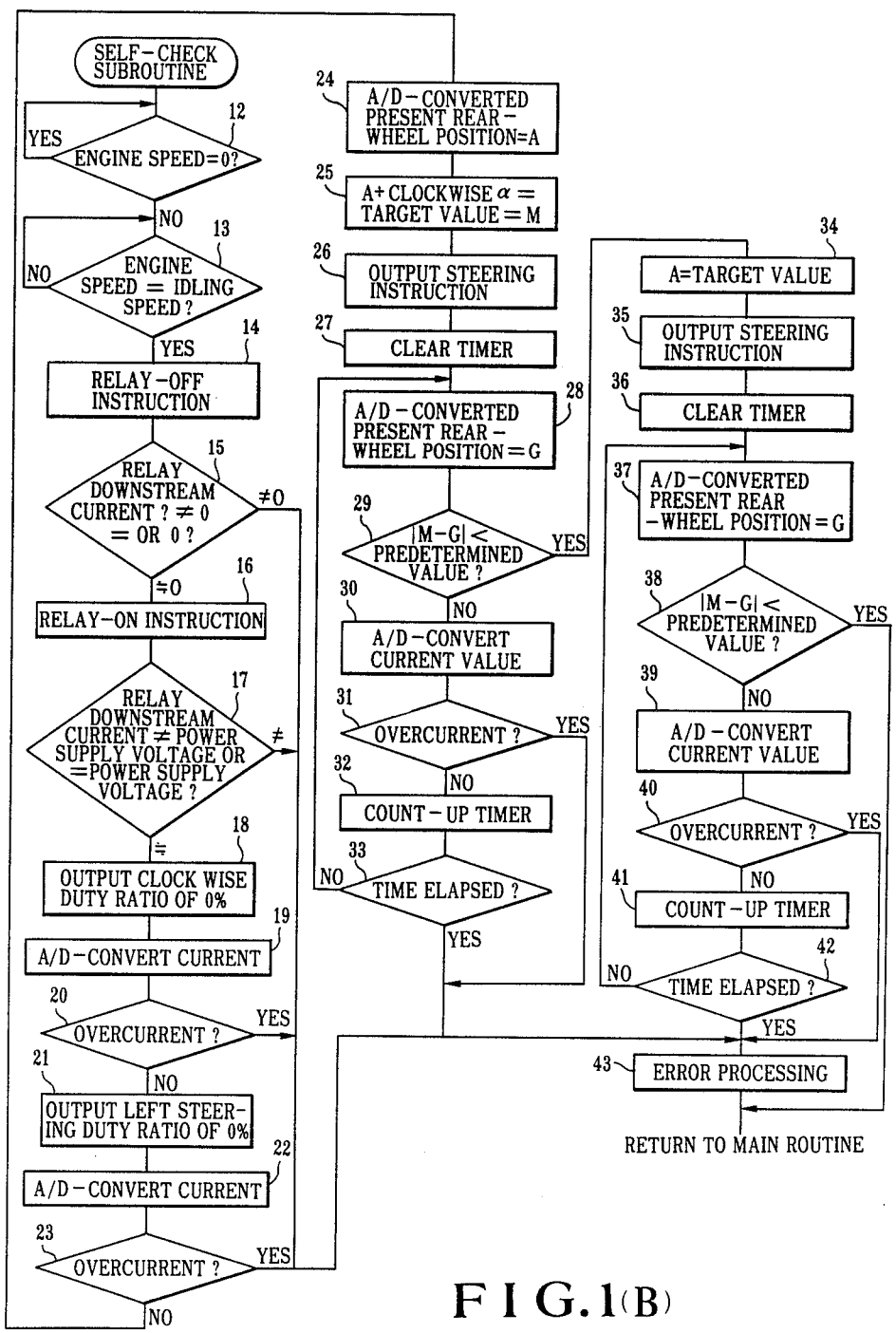

FIG. 2 shows a general four-wheel steering system of a vehicle. In FIG. 2, reference numeral 1 denotes a front-wheel steering apparatus having a front-wheel steering mechanism; 1a, a steering angle sensor; 1b, a column sensor; 2, a rear-wheel steering apparatus having a rear-wheel steering mechanism; 2a, a rear-wheel steering motor; 2b, reduction gears, 2c, a steering angle sensor; 2d, a centering spring; and 3, a controller having a steering angle ratio calculating mechanism for calculating a steering angle ratio in correspondence with a front-wheel steering angle or a vehicle velocity. The controller 3 includes a CPU (to be described later). Reference numeral 4 denotes a safety relay serving as a power supply relay to the motor 2a; 5, a fuse; 6, an ignition switch; and T, a power supply terminal for receiving an electrical power from a battery. The relay 4 receives an ON/OFF instruction from the CPU 8 through a relay driver RD.

In FIG. 2, the controller 3 has an H bridge circuit for driving the rear-wheel steering motor 2a, and detects the value of a current supplied through the H bridge circuit.

FIG. 3 shows the H bridge circuit constituted by four power transistors as switching elements, and a system for detecting the value of a current supplied through this circuit. The H bridge circuit is constituted by npn transistors Q1 to Q4. The motor 2a is connected between a contact c1 between the emitter of the transistor Q1 and the collector of the transistor Q3 and a contact c2 between the emitter of the transistor Q2 and the collector of the transistor Q4. The collectors of the transistors Q1 and Q2 are commonly connected, and then connected to the power supply terminal T through a contact 4a of the relay 4. The emitters of the transistors Q3 and Q4 are connected to a ground potential through a resistor R1. In the H bridge circuit with the above arrangement, a current supplied through this circuit is supplied through the resistor R1 regardless of the forward or reverse rotation of the motor 2a. Therefore, a voltage appearing across the resistor R1 can be checked to detect a value I of a current supplied through the H bridge circuit. The voltage appearing across the resistor R1 is amplified by an operational amplifier 7 including resistors R2, R3, and R4, and is input to an A/D converter 9 of a CPU 8 through a signal line 11. The A/D converted current value I is then fetched in the CPU. A downstream voltage of the relay 4 corresponds to the collector voltage of the transistors Q1 and Q2, and is input to the CPU 8. Reference numeral 10 denotes a driver for the power transistors Q1 to Q4. The driver 10 supplies a control signal to the bases of the transistors Q1 to Q4 on the basis of a control signal supplied from the CPU 8. The CPU 8 used herein receives a power supply voltage VDD through a transistor Q5. The base of the transistor Q5 is connected to a CPU reset circuit 12. The CPU reset circuit 12 controls the transistor Q5 to generate the power supply voltage VDD necessary for the CPU 8 and to perform control operations, e.g., power-on reset, watch-dog reset, low-voltage reset operations, and the like. For example, after power-on, when the voltage VDD to the CPU 8 exceeds a predetermined value V1, the CPU reset circuit 12 supplies a high-level RES signal to the CPU 8 to enable the CPU 8. When the voltage VDD becomes lower than a predetermined value V2, the RES signal goes to low level, thus resetting the CPU 8. When the power supply voltage exceeds the value V2, the RES signal goes to high level, thus enabling the CPU 8. When the CPU 8 stops supply of a watch-dog pulse to the CPU reset circuit 12, the RES signal is set at low level after a predetermined period of time, thus resetting the CPU 8. The watch-dog pulse monitors whether or not the CPU 8 is normally operated. When the CPU 8 is normally operated, this pulse is periodically generated. When the CPU 8 malfunctions, generation of this pulse is stopped. A generation mechanism of the watch-dog pulse is known to those who are skilled in the art, e.g., disclosed in Japanese Pat. Laid-Open (Kokai) No. 62-14535.

In the H bridge circuit used in this embodiment, when the rear wheels are to be steered to the left, the transistors Q1 and Q4 are turned on so that a current is supplied through the motor 2a in a direction of I1 (solid curve), and the transistors Q2 and Q3 are kept off. When the rear wheels are to be steered to the right, the transistors Q2 and Q3 are turned on so that a current is supplied through the motor 2a in a direction of I2 (broken curve) opposite to I1, thus changing the rotational direction of the motor 2a. In this case, the transistors Q1 and Q4 are kept off. When the motor is normally rotated counterclockwise, if the transistors Q2 and Q3 are merely turned on, the current I2 cannot be controlled. Thus, one of the transistors Q2 and Q3 is PWM-controlled to control the current I2. For example, if the transistors Q1 and Q2 are PWM transistors for controlling a current upon rotation, and the transistors Q3 and Q4 are direction-indication transistors, with a left steering PWM signal of a duty ratio of 50%, the transistor Q3 is ALL-ON, and the transistor Q2 performs a PWM operation with a duty ratio of 50%. Therefore, with a left steering PWM signal of a duty ratio of 0%, the transistor Q3 is ALL-ON, and the remaining transistors including Q2 are kept off.

FIGS. 1A and 1B are flow charts for explaining an embodiment of a self-check method of a four-wheel steering drive system according to the present invention. These flows are executed when the high-level RES signal is supplied from the CPU reset circuit 12, and a reset cancel state before starting traveling is set.

FIG. 1A shows a main routine of the four-wheel steering system. In step 101, predetermined initialization of this system is executed. The flow then advances to step 102 to set a self-check flag to "0". The flow then enters a main routine in step 103. It is checked in step 104 if the self-check flag is set. If it is determined in step 104 that the flag "1" is set, this indicates that a self-check operation is already performed, and the flow advances to main control in step 106. If it is determined in step 104 that the self-check flag "0" is set, the flow advances to step 110. A state wherein the self-check flag "0" is set corresponds to a state immediately after an engine is started. It is checked in step 110 if a vehicle velocity is detected. If YES in step 110, this means that a vehicle is traveling, and the flow advances to step 111 without performing the self-check operation. In step 111, the self-check flag "1" is set, and the flow advances to the main control in step 106. The main control is known to those who are skilled in the art, as described in Japanese Pat. Laid-Open (Kokai) No. 62-14535, and is not directly related to the present invention. Thus, its detailed description will be omitted.

If NO in step 110, i.e., no vehicle velocity is detected, the flow advances to step 112 to check whether or not the engine is started. If YES in step 112, the flow advances to step 111, and the self-check flag "1" is set. The flow then advances to the main control in step 106. If NO in step 112, the flow advances to step 113, and the flag "1" is set. The flow then advances to step 114, and the self-check operation as the characteristic feature of the present invention shown in FIG. 1B is executed.

The self-check operation shown in FIG. 1B will be described below. It is checked in step 12 if an engine speed is zero, thus confirming an operation of the engine.

If YES in step 12, a standby state continues until the engine is started. If NO in step 12, i.e., if the engine is operating, the flow advances to step 13 to check if the engine is in an idling state. If NO in step 13, the engine is monitored until the idling state is set. If YES in step 13, the flow advances to step 14, and the self-check operation of the four-wheel steering drive system as the characteristic feature of the present invention is started. More specifically, the self-check operation is started when no vehicle velocity is detected and the engine speed corresponds to an idling speed.

In steps 14 to 17, the contact 4a of the relay 4 is checked. In step 14, an OFF instruction of the relay 4 is output from the CPU 8. It is checked in step 15 if a downstream current of the relay 4 is zero or substantially zero. If YES in step 15, the flow advances to step 16; otherwise, an error is determined and error processing in step 43 is executed. In step 16, an ON instruction of the relay 4 is output from the CPU 8, and the flow then advances to step 17 to check if the downstream voltage of the relay 4 is a power supply voltage. If YES in step 17, the flow advances to step 18; otherwise, an error is determined, and error processing in step 43 is executed.

In steps 18 to 23, the presence/absence of arm short-circuiting of the H bridge circuit, i.e., short-circuiting of the transistors Q1 to Q4 is detected. In step 18, the left steering PWM (pulse-width modulation) signal of a duty ratio of 0% is output. In this case, as described above, the transistor Q3 must be ALL-ON, and the remaining transistors Q1, Q2, and Q4 must be kept off. If the transistor Q1 is short-circuited, an overcurrent is supplied along a path of Q1→Q3→R1. This is called arm short-circuiting. The overcurrent is detected as a change in voltage by the resistor R1, and is fetched in the CPU 8 through the amplifier 7. The fetched signal is then A/D-converted by the converter 9 (step 19). The CPU 8 checks the overcurrent in step 20, and determines arm short-circuiting. Error processing in step 43 is then executed. If no overcurrent is supplied through the resistor R1, the CPU 8 determines that the transistors Q1, Q2, and Q4 are normal, and the flow advances to step 21.

In step 21, a right steering PWM signal of a duty ratio 0% is output. In this case, the transistor Q4 must be ALL-ON, and the remaining transistors Q1, Q2, and Q3 must be kept off. If the transistor Q2 is short-circuited, an overcurrent is supplied along a path of Q2→Q4→R1. The overcurrent is detected as a change in voltage by the resistor R1, and is fetched in the CPU 8 through the amplifier 7. The fetched signal is then A/D-converted by the converter 9 (step 22). The CPU 8 checks the overcurrent in step 23, and determines arm short-circuiting. Error processing in step 43 is then executed. If no overcurrent is supplied through the resistor R1, the CPU 8 determines that the transistors Q1, Q2, and Q3 are normal, and the flow advances to step 24. Note that after the error processing is executed in step 43, the flow returns to the main routine shown in FIG. 1A.

In steps 24 to 33, whether or not a rear-wheel right steering operation is normally performed, i.e., the motor 2a and the rear-wheel right steering mechanism are checked. First, a rear-wheel present position is detected (step 24), and a clockwise angle is added to the rear-wheel present position to calculate a target value M (step 25). The value M is small enough to steer the wheels slightly. A steering operation is instructed (step 26), and a timer is cleared (step 27). A rear-wheel present position G is detected, and it is checked if a difference (|M - G|) between the present position and the target value is a predetermined value or less (steps 28 and 29). If NO in step 29, a current value is detected to check if the current value corresponds to an overcurrent (steps 30 and 31). If NO in step 31, it is checked if a lapse time is within a predetermined period of time (steps 32 and 33). If NO in step 33, the flow returns to step 28, and the processing in steps 28 to 33 is repeated. If the difference between the present position and the target value becomes the predetermined value or less within the predetermined period of time, the flow advances to step 34; otherwise, the flow advances from step 33 to step 43 to execute error processing. If an overcurrent is detected in step 31, an error is determined, and error processing is executed (step 43).

In steps 34 to 42, whether or not a rear-wheel left steering operation is normally performed, i.e., the motor 2a and the rear-wheel left steering mechanism are checked. The operations in steps 34 to 42 are substantially the same as those in steps 24 to 33 except for the steering direction. Therefore, a detailed description thereof will be omitted. If it is determined in step 38 that the difference between the rear-wheel present position and the target value is the predetermined value or less, the flow returns to the main routine in FIG. 1A.

As described above, in the self-check method of the four-wheel steering drive system according to the present invention, the relay is checked by a relay downstream voltage in a relay ON/OFF mode in a reset cancel state before starting traveling, and the transistors constituting the H bridge circuit are checked on the basis of the presence/absence of an overcurrent when left and right steering PWM signals of a duty ratio of 0% are input to the H bridge circuit. When a target rear-wheel position is given, whether or not a difference between the target rear-wheel position and the present rear-wheel position is converted to a predetermined value or less within a predetermined period of time is checked to check the steering motor and the rear-wheel steering mechanism. Thus, an abnormal steering operation or mechanism locking operation caused by reverse connection of a motor connector, a sensor connector, or the like can be detected while a vehicle stands still. If the H bridge circuit for rotating the motor in the forward or reverse direction malfunctions, it can be detected while the vehicle stands still. Thus, the self-check operation of the four-wheel steering drive system can be completely performed.

In this embodiment, the H bridge circuit is constituted by npn bipolar transistors, but may be constituted by FETs shown in FIG. 4. When the FETs are used, each switching element can be constituted by two or more FETs which are connected parallel to each other. In this manner, when the FETs are connected parallel to each other, an ON resistance can be decreased, and a large current can be coped with.

What is claimed is:

1. A self-check method of a four-wheel steering drive system for a vehicle, which comprises a rear-wheel steering mechanism for steering rear wheels, a steering motor for driving said rear-wheel steering mechanism, an H bridge circuit, consisting of four switching elements, for driving said steering motor in a forward or reverse direction to turn said rear wheels to the left or right, and a relay for turning on/off a battery power supply with respect to said H bridge circuit, comprising the steps of, when an engine of the vehicle is in an idling state before starting traveling:

(1) checking a relay downstream current upon ON/OFF of said relay to check a state of said relay;
   (2) supplying forward and reverse rotation control signals of a duty ratio of 0% to a predetermined combination of said switching elements constituting said H bridge circuit to check if a current obtained from said predetermined combination of switching elements is an overcurrent, thereby checking a state of said H bridge circuit; and
   (3) when the rear wheels are turned to a target rear wheel position with reference to a present rear-wheel position, checking whether or not a difference between the target rear-wheel position and an actual rear-wheel position is set to be not more than a predetermined value within a predetermined period of time, thereby checking a state of said steering motor and said rear-wheel steering mechanism.

2. A method according to claim 1, wherein each of said switching elements comprises a power transistor.

3. A method according to claim 1, wherein a self-check operation is performed in a CPU reset cancel state before starting traveling.

4. A method according to claim 1, wherein each of said switching elements comprises a bipolar transistor.

5. A method according to claim 1, wherein each of said switching elements comprises a field effect transistor.

6. A method according to claim 1, wherein each of said switching elements comprises at least two parallel-connected field effect transistors.

* * * * *

UNITED STATES PATENT AND TRADEMARK OFFICE
CERTIFICATE OF CORRECTION

PATENT NO. : 4,961,144
DATED : October 2, 1990
INVENTOR(S) : Yabe et al.

It is certified that error in the above-identified patent and that said Letters Patent is hereby corrected as shown below:

| | | |
|---|---|---|
| col. 02, line 42 | delete "11" | insert --$\ell 1$-- |
| col. 03, line 16 | delete "12" | insert --l2-- |
| col. 03, line 21 | delete "12" | insert --l2-- |
| col. 03, line 23 | delete "12" | insert --l2-- |
| col. 05, line 02 | after "clockwise" | insert --$\alpha$-- |

Signed and Sealed this

Twenty-sixth Day of January, 1993

*Attest:*

STEPHEN G. KUNIN

*Attesting Officer*     *Acting Commissioner of Patents and Trademarks*